US006884382B2

(12) United States Patent
Lynch et al.

(10) Patent No.: US 6,884,382 B2
(45) Date of Patent: Apr. 26, 2005

(54) STRETCHED CONTAINER THREADS AND METHOD OF MANUFACTURE

(75) Inventors: Brian A. Lynch, Merrimack, NH (US); Keith J. Barker, Candia, NH (US); Thomas E. Nahill, Amherst, NH (US)

(73) Assignee: Graham Packaging PET Technologies Inc., York, PA (US)

(*) Notice: Subject to any disclaimer, the term of this patent is extended or adjusted under 35 U.S.C. 154(b) by 91 days.

(21) Appl. No.: 10/351,658

(22) Filed: Jan. 24, 2003

(65) Prior Publication Data

US 2004/0146672 A1 Jul. 29, 2004

(51) Int. Cl.[7] ................................................ B29C 49/00

(52) U.S. Cl. ....................... 264/521; 264/529; 264/537; 264/908

(58) Field of Search ................................ 264/521, 529, 264/537, 908

(56) References Cited

U.S. PATENT DOCUMENTS

| | | | | |
|---|---|---|---|---|
| 3,048,889 A | | 8/1962 | Fischer | |
| 3,164,646 A | | 1/1965 | Fischer | |
| 3,278,664 A | | 10/1966 | Langecker | |
| 3,311,950 A | | 4/1967 | Strauss | |
| 3,457,592 A | | 7/1969 | Winchester | |
| 3,649,150 A | * | 3/1972 | Gilbert | 425/297 |
| 3,695,805 A | | 10/1972 | Gilbert | |
| 3,769,394 A | | 10/1973 | Latreille | |
| 4,065,535 A | | 12/1977 | LeGrand | |
| 4,116,607 A | | 9/1978 | LeGrand | |
| 4,119,394 A | | 10/1978 | Cary | |
| 4,126,658 A | | 11/1978 | Rupert | |
| 4,158,692 A | | 6/1979 | Nilsson | |
| 4,297,306 A | | 10/1981 | Yoshino | |
| 4,382,769 A | | 5/1983 | Younkin | |
| 4,386,046 A | | 5/1983 | Yoshino | |
| 4,397,629 A | | 8/1983 | Akutsu | |
| 4,412,966 A | | 11/1983 | Yoshino | |
| 4,442,063 A | | 4/1984 | Younkin | |
| 4,499,044 A | | 2/1985 | Hone | |
| 4,578,028 A | | 3/1986 | Dirksing | |
| 4,704,243 A | | 11/1987 | Nilsson et al. | |
| 4,929,410 A | | 5/1990 | Meyer | |
| 6,068,811 A | * | 5/2000 | Koda | 264/537 |
| 6,228,317 B1 | | 5/2001 | Smith | |
| 6,238,200 B1 | | 5/2001 | Spoetzl | |

FOREIGN PATENT DOCUMENTS

| | | |
|---|---|---|
| DE | 1299406 | 7/1969 |
| GB | 1339335 | 12/1973 |
| IT | 713736 | 9/1966 |
| JP | 62-164504 | 7/1987 |
| JP | 03-092329 | 4/1991 |
| WO | WO 02/00418 A1 | 1/2002 |

* cited by examiner

*Primary Examiner*—Suzanne E. McDowell
(74) *Attorney, Agent, or Firm*—Venable LLP; James R. Burdett; Keith G. Haddaway

(57) ABSTRACT

A method of making a plastic container having a body and a finish with at least one external thread includes injection or compression molding a plastic preform having a body and a finish with at least one external thread, blow molding the body of the preform to form the body of the container, and either prior to, subsequent to or both prior and subsequent to blow molding the container body, expanding the injection or compression molded preform finish to form a container finish having at least one injection or compression molded external thread. In the preferred embodiments of the invention, the finish is expanded after the container body is blow-molded. The invention can be implemented to expand a narrow-neck preform or container finish to a wide-mouth preform or container finish.

20 Claims, 2 Drawing Sheets

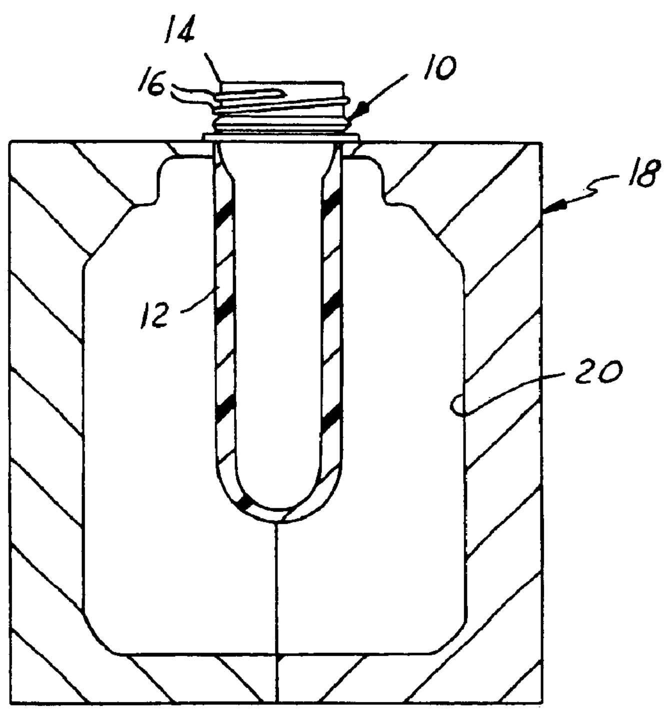
FIG. 1
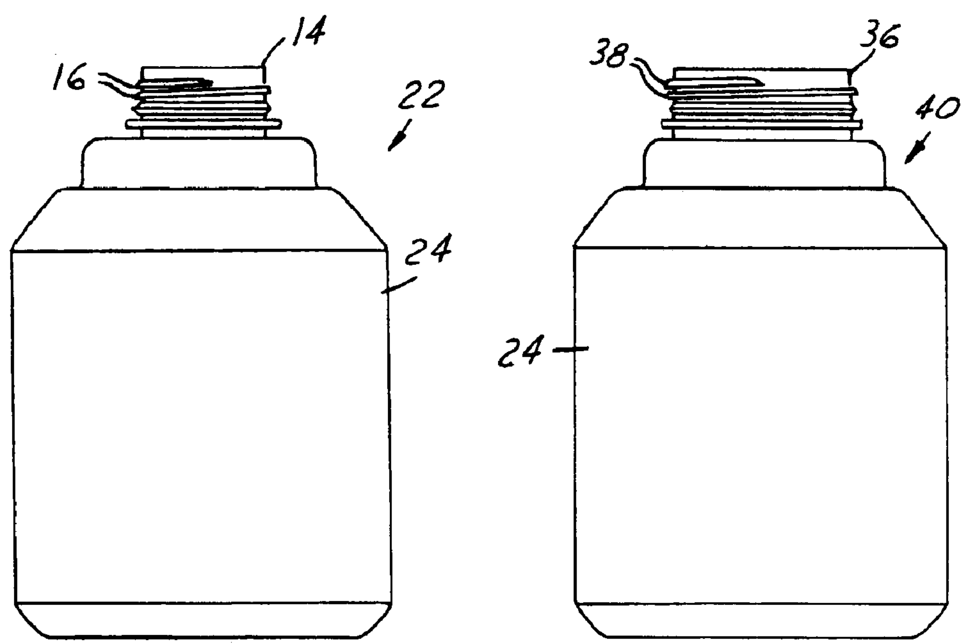
FIG. 2
FIG. 4

STRETCHED CONTAINER THREADS AND METHOD OF MANUFACTURE

The present invention is directed to molded plastic containers, and to methods of manufacturing such containers.

BACKGROUND AND SUMMARY OF THE INVENTION

In the manufacture of plastic containers, such as monolayer or multilayer PET containers, it is conventional to mold a container preform having a body and a finish with one or more external threads. The finish is typically molded to its final geometry, while the body of the preform is subsequently blow molded to the desired geometry of the container body. Although this manufacturing technique is satisfactory for fabrication of containers of differing finish diameters, the throughput of the process is greatly reduced when employed for fabricating preforms and containers of increased finish diameter. For example, a preform mold cavity block having ninety-six mold cavities for preforms with a 28 mm finish diameter would typically accommodate only forty-eight cavities having a 43 mm finish diameter for the same overall cavity block size. This throughput is even further reduced for wide-mouth preforms having a finish diameter greater than about 2.0 inches or 50 mm.

To address this manufacturing throughput problem, it has been proposed to fabricate a wide-mouth container by molding a narrow-neck preform, and then blow molding the preform body within a cavity that forms the container body, the container finish with threads, and a trim moil or dome that must be removed from the container body and finish, along with the preform finish, after the container is removed from the mold. Although this technique permits use of narrow-neck preforms, and thus maintains high throughput during the preform molding stage, the technique has the disadvantage that the moil and preform finish constitute trim scrap that must be recycled or discarded. Furthermore, when fabricating multilayer contains having an intermediate layer of barrier resin for example, this technique presents the disadvantage that an edge of the barrier layer is exposed at the moil trim plane, which can result in substantial water vapor absorption and loss of barrier properties for many hydrophilic barrier resins such as ethylene vinyl alcohol (EVOH). Moreover, and perhaps most importantly, the external threads on the container finish are blow molded in this technique, and are not as sharply defined and detailed as are external threads formed by direct molding.

It is therefore a general object of the present invention to provide a method of making a plastic container, and/or a plastic container formed by such method, in which the container threads are formed by pressure molding (compression or injection molding) rather than blow molding, and which maintains high throughput in the preform molding stage.

A method of making a plastic container having a body and a finish with at least one external thread, in accordance with a first aspect of the present invention, includes pressure molding (i.e., injection or compression molding) a plastic preform having a body and a finish with at least one external thread, blow molding the body of the preform to form the body of the container, and either prior to, subsequent to or both prior and subsequent to blow molding the container body, expanding the pressure molded preform finish to form a container finish having at least one pressure molded external thread. In the preferred embodiments of the invention, the finish is expanded after the container body is blow molded. The invention can be employed to expand the preform or container finish from a small narrow-neck diameter such as 28 mm to a larger narrow-neck diameter such as 43 mm. The invention can also be implemented to expand a narrow-neck preform or container finish to a wide-mouth preform or container finish, such as 28 mm to 63 mm or 48 mm to 63 mm. The invention can also be implemented to expand a wide-mouth finish into a larger wide-mouth finish, such as 63 mm to 83 mm.

BRIEF DESCRIPTION OF THE DRAWINGS

The invention, together with additional objects, features and advantages thereof, will be best understood from the following description, the appended claims and the accompanying drawings in which:

FIG. 1 is a schematic diagram of a preform and a blow mold for molding an intermediate container product in accordance with one presently preferred implementation of the invention;

FIG. 2 is a schematic elevational view of an intermediate container after blow molding in FIG. 1;

FIG. 4 is a schematic elevation view of a container having an expanded finish following the process of FIG. 3.

DETAILED DESCRIPTION OF PREFERRED EMBODIMENTS

Figure 3:
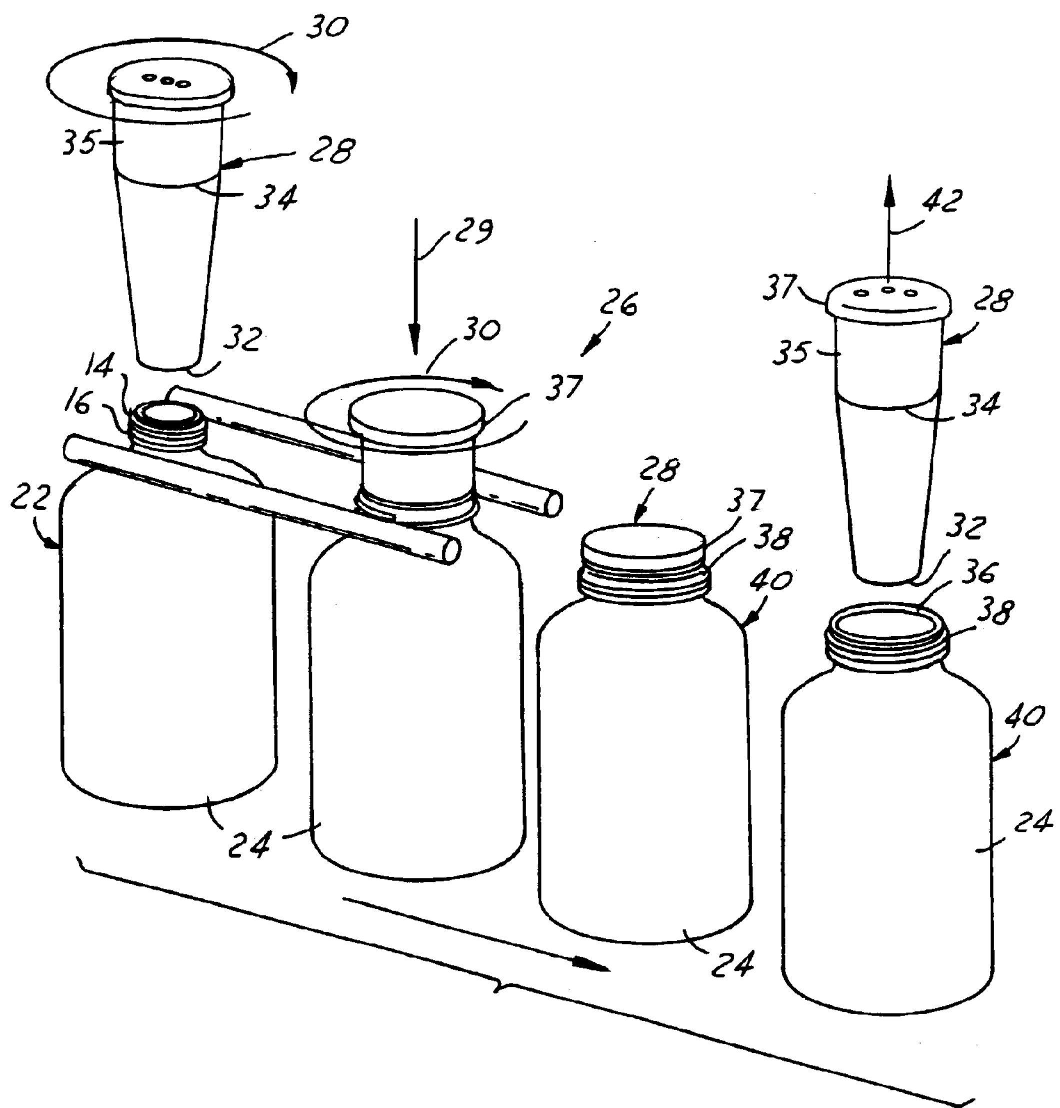
FIG. 3 is a schematic diagram of apparatus for expanding the finish of the intermediate container illustrated in FIG. 2.

The terms "narrow-neck" finish and "wide-mouth" finish are employed in their conventional senses in the present application, in that a "wide-mouth" finish has an outside diameter (E diameter) greater than about 2.0 inches or 50 mm, while a narrow-neck finish has an outside diameter equal to or less than about 2.0 inches or 50 mm. 28 mm and 43 mm finishes are typical narrow-neck finishes in the plastic container industry, although the present invention is by no means limited to these particular finish diameters. A 63 mm finish is a conventional relatively small wide-mouth finish in the plastic container industry, although the present invention again is not limited to wide-mouth finishes of this particular size. An 83 mm finish is a larger conventional wide-mouth finish size.

FIG. 1 illustrates a preform 10 as comprising a body 12 and an integrally molded finish 14. Finish 14 has one-or more external threads 16 integrally molded on the finish. Preform 10 can be fabricated in a pressure molding operation, and can be of monolayer or multilayer construction. (For purposes of this application, the term "pressure molding" encompasses and is limited to injection and compression molding. See U.S. Pat. No. 4,690,633.) A typical preform 10 can have multiple layers, including internal and external layers, of polyethylene terephthalate (PET) construction, and one or more intermediate layers of barrier material such as EVOH or nylon. The intermediate layer or layers are disposed in preform body 12, and may or may not extend into preform finish 14. It will be understood that the present invention is by no means limited to these exemplary materials, although the present invention does enjoy a particular advantage in connection with PET finishes, as will be described.

Preform 10 is positioned in a blow mold 18, with preform body 12 being disposed within a cavity 20 formed by mold 18. Application of air under pressure to the interior of preform 10 expands preform body 12 to the confines of mold cavity 20. The resulting intermediate container 22 is illustrated in FIG. 2, having a blow molded body 24 formed by expansion of preform body 12, and an integrally molded finish 14 with external threads 16. Container 22 is then directed to a finish expansion apparatus 26 illustrated in FIG. 3. A plug 28 is inserted at 29 into container finish 14 and rotated at 30 about its axis. Plug 28 has a conical end, with a minimum diameter 32 less than the inside diameter of preform finish 14 as initially molded, and a larger diameter 34 equal to or slightly greater than (to allow for relaxation) the desired final finish inside diameter. Plug 28 also has a cylindrical portion 35 to fit into and spin within the expanded container finish. A lip 37 frictionally engages the axial edge or top sealing surface of the finish to keep it flat. Plug 28 can be heated so as to heat container finish 14 by conduction and thereby facilitate plastic expansion of the container finish. As an alternative, the container finish can be heated prior to insertion of the expansion plug. As another alternative, plug 37 can be stationary, and the bottle rotated during insertion. Air could be fed through plug 28 to stiffen the container sidewall. Other means of expansion could be used, such as an air bladder, in place of plug 28.

Plug 28 is subsequently withdrawn at 42, leaving a container 40 with an expanded finish 36 (FIGS. 3 and 4). Finish 36 has external threads 38 that are similar in geometry to preform threads 16, but radially and circumferentially expanded along with the finish. Thus, threads 38 are expanded or stretched as compared with preform threads 16, but otherwise have a geometry determined by the geometry of threads 16 as molded, which are more sharply defined and detailed than threads that can be obtained by blow molding. Thus, FIG. 4 illustrates a container 40 having a body 24 and an integral finish 36 with expanded threads 38.

In one implementation of the present invention, a finish having an initial diameter of 28 mm can be expanded to a 43 mm finish diameter, or a diametric expansion of about 53.6%. In another implementation of the invention, a 43 mm finish diameter can be expanded to a 63 mm finish diameter, or an expansion of about 46.5%. In a third implementation of the invention, a 28 mm finish diameter can be expanded to a 63 mm finish diameter, with an expansion of about 125%. In yet another implementation of the invention, a 63 mm finish diameter can be expanded to 83 mm, or an expansion of about 32%. A finish may be subjected to multiple expansions, if desired, such as an expansion from 43 mm to 63 mm, followed by an expansion from 63 mm to 83 mm. The preform threads and finish will need to be larger and thicker than the final desired size to arrive at the proper dimensions after stretching. As noted above, the finish can be heated prior to or during stretching, such as by conduction from the expansion plug and/or by other means such as radiant heating. Stretching of the finish and threads achieves an advantageous molecular orienting in the finish and threads. Stretching also strengthens the neck area of the final container. It is also envisioned that the container finish can be wholly or partially crystallized during or after expansion to prevent substantial relaxation and shrinkage, particularly when the container is to be employed in hot-fill applications. Such crystallization can be on the exterior surface of the finish including the threads, or may extend entirely through the thickness of the container finish. Such crystallization can be carried out either simultaneously with or subsequent to expanding the finish and stretching the finish threads.

Expansion of the container finish is carried out in a single step in the embodiments thus far discussed. On the other hand, the finish expansion could be in sequential stages before and after blow molding. For example, an initial 28 mm finish could be expanded to 43 mm prior to blow molding the container body, for example where the blow molds are set to accept 43 mm preforms. After blow molding, the finish could then be further expanded to 63 mm. As another modification, the finish could be slightly over-expanded, and then allowed to shrink and relax. For example, the finish could be expanded from 43 mm to 63.5 mm, and then allowed to shrink, perhaps onto a plug, to 63 mm. This would have the advantage of allowing stress relief after expansion. Shrinkage could be induced by exposure to heat, such as during a crystallization operation.

There have thus been disclosed a method of making a plastic container and a plastic container that fully achieve all of the objects and aims previously set forth. The invention has been disclosed in conjunction with presently preferred embodiments thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A method of making a plastic container having a body and a wide-mouth finish with at least one external thread formed by injection or compression molding, which comprises the steps of:

(a) pressure molding a plastic preform having a body and a narrow-neck finish with at least one external thread, (b) blow molding the body of said preform to form the body of the container, and (c) expanding said pressure molded finish radially outwardly to form a wide-mouth finish on the container body and having at least one pressure molded external thread.

2. The method set forth in claim 1 including the additional step of:

(d) crystallizing said wide-mouth finish either simultaneously with or subsequent to said step (c).

3. The method set forth in claim 1 comprising the additional step of: (d) heating said finish prior to or during said step (c).

4. The method set forth in claim 3 wherein said step (c) is carried out by inserting a plug into said finish.

5. The method set forth in claim 4 comprising the additional step of rotating said plug or said finish during insertion of said plug into said finish.

6. The method set forth in claim 5 wherein said finish is expanded at least 32% in said step (c).

7. The method set forth in claim 6 wherein said finish is expanded at least 125% in said step (c).

8. The method set forth in claim 1 wherein said step (c) is carried out prior to said step (b).

9. The method set forth in claim 1 wherein said step (c) is carried out subsequent to said step (b).

10. The method set forth in claim 1 wherein said step (c) is carried out in at least two stages, one stage prior to said step (b) and a second stage subsequent to said step (b).

11. A method of making a plastic container having a body and a finish with at least one external thread, which comprises the steps of:

(a) pressure molding a plastic preform having a body and a finish with at least one external thread, (b) blow molding the body of said preform to form the body of the container, and (c) expanding said injection molded preform finish radially outwardly to form a container finish having at least one pressure molded external thread.

12. The method set forth in claim 11 comprising the additional step of: (d) heating said finish prior to or during said step (c).

13. The method set forth in claim 12 wherein said step (c) is carried out by inserting a plug into said finish.

14. The method set forth in claim 13 comprising the additional step of rotating said plug or said finish during insertion of said plug into said finish.

15. The method set forth in claim 11 including the additional step of:

(d) crystallizing said finish either simultaneously with or subsequent to said step (c).

16. A method of making a plastic container having a body and a finish with at least one external thread which comprises the steps of:

(a) pressure molding a plastic preform having a body and a finish with at least one external thread, (b) blow molding the body of said preform to form the body of the container, and (c) either priorto or subsequent to said step (b), expanding said pressure molded preform finish radially outwardly at least 32%.

17. The method set forth in claim 16 comprising the additional step of: (d) heating said finis prior to or during said step (c).

18. The method set forth in claim 17 wherein said step (c) is carried out by inserting a plug into said finish.

19. The method set forth in claim 18 comprising the additional step of rotating said plug or said finish during said step (c).

20. The method set forth in claim 16 including the additional step of:

(d) crystallizing said finish either simultaneously with or subsequent to said step (c).

* * * * *